(12) United States Patent
Toda et al.

(10) Patent No.: US 11,180,824 B2
(45) Date of Patent: *Nov. 23, 2021

(54) HOT STAMPED ARTICLE

(71) Applicant: NIPPON STEEL CORPORATION, Tokyo (JP)

(72) Inventors: Yuri Toda, Tokyo (JP); Kazuo Hikida, Tokyo (JP); Shingo Fujinaka, Tokyo (JP); Tomohito Tanaka, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/971,133

(22) PCT Filed: Mar. 29, 2018

(86) PCT No.: PCT/JP2018/013365
§ 371 (c)(1),
(2) Date: Aug. 19, 2020

(87) PCT Pub. No.: WO2019/186928
PCT Pub. Date: Oct. 3, 2019

(65) Prior Publication Data
US 2021/0102270 A1    Apr. 8, 2021

(51) Int. Cl.
*B32B 15/00* (2006.01)
*C21D 9/46* (2006.01)
(Continued)

(52) U.S. Cl.
CPC .............. *C21D 9/46* (2013.01); *B32B 15/013* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0236* (2013.01); *C22C 38/001* (2013.01); *C22C 38/002* (2013.01); *C22C 38/02* (2013.01); *C22C 38/06* (2013.01); *C22C 38/28* (2013.01);
(Continued)

(58) Field of Classification Search
None
See application file for complete search history.

(56) References Cited

U.S. PATENT DOCUMENTS

2002/0040744 A1*  4/2002  Kanisawa ................ C21D 8/06
                                                           148/320
2013/0095347 A1   4/2013  Kawasaki et al.
(Continued)

FOREIGN PATENT DOCUMENTS

JP    2902-309345 A    10/2002
JP    5114691 B2        1/2013
(Continued)

*Primary Examiner* — Seth Dumbris
(74) *Attorney, Agent, or Firm* — Birch, Stewart, Kolasch & Birch, LLP

(57) ABSTRACT

A hot stamped article excellent in strength having a predetermined composition, having an average crystal grain size of prior austenite of 3 μm or less, containing at least one of lower bainite, martensite, and tempered martensite in an area rate of 90% or more, and having a grain boundary solid solution ratio Z, defined by Z=(mass % of one or both of Nb and Mo at the grain boundaries)/(mass % of one or more of Nb and Mo at time of dissolution) of 0.3 or more.

2 Claims, 1 Drawing Sheet

(51) Int. Cl.
*B32B 15/01* (2006.01)
*C21D 6/00* (2006.01)
*C21D 8/02* (2006.01)
*C22C 38/00* (2006.01)
*C22C 38/02* (2006.01)
*C22C 38/06* (2006.01)
*C22C 38/28* (2006.01)
*C22C 38/44* (2006.01)
*C22C 38/48* (2006.01)
*C22C 38/54* (2006.01)
*C22C 38/58* (2006.01)

(52) U.S. Cl.
CPC ............... *C22C 38/44* (2013.01); *C22C 38/48* (2013.01); *C22C 38/54* (2013.01); *C22C 38/58* (2013.01); *C21D 2211/008* (2013.01); *Y10T 428/12799* (2015.01)

(56) References Cited

U.S. PATENT DOCUMENTS

| | | | |
|---|---|---|---|
| 2013/0292009 A1* | 11/2013 | Hayashi | C22C 38/04 148/518 |
| 2013/0295402 A1* | 11/2013 | Oh | C21D 1/18 428/551 |
| 2017/0096724 A1 | 4/2017 | Hikida et al. | |
| 2018/0044748 A1* | 2/2018 | Takagi | C21D 8/10 |
| 2019/0003004 A1* | 1/2019 | Cho | C22C 38/44 |
| 2019/0382864 A1* | 12/2019 | Cho | C21D 1/18 |

FOREIGN PATENT DOCUMENTS

| | | |
|---|---|---|
| JP | 5369714 B2 | 12/2013 |
| JP | 2014-15638 A | 1/2014 |
| WO | WO 2015/147216 A1 | 10/2015 |

\* cited by examiner

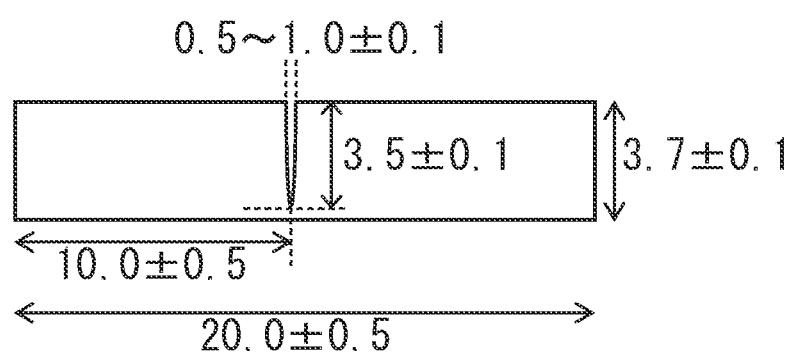

HOT STAMPED ARTICLE

FIELD

The present invention relates to a hot stamped article particularly excellent in strength used for structural members or reinforcing members of automobiles or structures where strength is required.

BACKGROUND

In recent years, from the viewpoints of environmental protection and resource saving, lighter weight of automobile bodies is being sought. For this reason, application of high strength steel sheet to automobile members has been accelerating. However, along with the increase in strength of steel sheets, the formability deteriorates, so in high strength steel sheets, formability into members with complicated shapes is a problem.

To solve this problem, hot stamping, where the steel sheet is heated to a high temperature of the austenite region, then press formed, is increasingly being applied. Hot stamping performs press forming and simultaneously quenching in the die, so is being taken note of as a technique achieving both formation of a material into an automobile member and securing of strength.

On the other hand, a shaped part obtained by hot stamping high strength steel sheet requires performance inhibiting deformation at the time of collision (portion inhibiting deformation at collision). For this reason, a high strength is required after hot stamping.

PTL 1 discloses as art meeting this demand to anneal a steel sheet for hot stamping use and concentrate the Mn or Cr in carbides to make the carbides difficult to dissolve to thereby suppress the growth of and refine the austenite by these carbides at the time of heating for hot stamping.

PTL 2 discloses the art of raising the temperature by a 90° C./s or less heating rate at the time of hot stamping to thereby refine the austenite.

PTL 3, PTL 4, and PTL 5 also disclose the art of refining the austenite to improve the toughness.

CITATIONS LIST

Patent Literature

[PTL 1] WO 2015/147216
[PTL 2] Japanese Patent No. 5369714
[PTL 3] Japanese Patent No. 5114691
[PTL 4] Japanese Unexamined Patent Publication No. 2014-15638
[PTL 5] Japanese Unexamined Patent Publication No. 2002-309345

SUMMARY

Technical Problem

However, in the arts disclosed in the above PTLs 1 to 5, it is difficult to obtain further refined austenite and no strength greater than in the past can be expected.

The present invention, in consideration of the technical issues in the prior art, has as its technical issue securing better strength and has as its object the provision of a hot stamped article solving the technical issue.

Solution to Problem

The inventors engaged in an in-depth study of a method for solving the above technical issues. As a result, they discovered that by making the grain size of the prior austenite 3 μm or less and further making one or both of Nb and Mo form a solid solution at the prior austenite grain boundaries to raise the brittle strength of the grain boundaries, more excellent shock absorption compared with the past is obtained.

The present invention was made after further study based on the above discovery and has as its gist the following:

(1) A hot stamped article having a chemical composition comprising, by mass %, C: 0.35% to 0.75%, Si: 0.005% to 0.25%, Mn: 0.5% to 3.0%, sol. Al: 0.0002% to 3.0%, Cr: 0.05% to 1.00%, B: 0.0005% to 0.010%, Nb: 0.01% to 0.15%, Mo: 0.005% to 1.00%, Ti: 0% to 0.15%, Ni: 0% to 3.00%, P: 0.10% or less, S: 0.10% or less, N: 0.010% or less, and a balance of Fe and unavoidable impurities, microstructures in which prior austenite has an average crystal grain size of 3 μm or less, at least one of lower bainite, martensite, and tempered martensite are contained with an area rate of 90% or more, and a grain boundary solid solution ratio Z defined by Z=(mass % of one or both of Nb and Mo at the grain boundaries)/(mass % of one or more of Nb and Mo at time of dissolution) is 0.3 or more.

(2) A hot stamped article of the above (1), wherein the hot stamped article comprises a plated layer.

Advantageous Effects of Invention

According to the present invention, it is possible to provide a hot stamped article having excellent strength.

BRIEF DESCRIPTION OF DRAWINGS

FIG. 1 is a view showing the shape of a test piece when measuring the grain boundary solid solution ratio.

DESCRIPTION OF EMBODIMENTS

The present invention features making the grain size of the prior austenite 3 μm or less and further making one or more of Nb and Mo form a solid solution at the prior austenite grain boundaries to raise the brittle strength of the grain boundaries. The inventors engaged in in-depth studies and as a result discovered that the above microstructures are obtained by the following method.

As a first stage, the amount of casting of the molten steel per unit time is controlled. Due to this, the microsegregation of Mn in the steel slab is suppressed and further the precipitation of Mo and Nb is suppressed and the amount of solid solution of the Mo and Nb in the steel is made to increase.

If controlling the amount of casting of the molten steel per unit time to reduce the microsegregation of Mn, the trap sites of P are lost, so at the time of finish rolling, P precipitates at the prior austenite grain boundaries. This being so, regardless of refining the prior austenite grain boundaries, the brittle strength of the grain boundaries is lowered and the shock absorption cannot be sufficiently obtained. This is because Mn and P are high in affinity, so segregation of Mn functions to create sites for trapping P and elimination of segregation results in P dispersing to the austenite grain boundaries. In the present invention, this problem is resolved by the second stage of control of the rolling conditions.

As a second stage, the rolling reduction and temperature of the hot finish rolling, cooling conditions after rolling, and coiling temperature are controlled to suppress concentration of Mn in the carbides and form easily dissolvable fine carbides and further to introduce high density dislocations into the steel. In the present invention, both the finely dispersed carbides and high density dislocations become sites for reverse transformation of austenite thereby refining the prior austenite grains. To make them effectively function as sites for reverse transformation, the carbides desirably easily dissolve. For this reason, it is important to not allow Mn, Cr, and other elements obstructing the dissolution of carbides to concentrate at the carbides.

Further, by keeping the Mo, Nb from precipitating and making the Nb and Mo form solid solutions at the grain boundaries of the prior austenite, the sites for segregation of P are occupied by Nb and Mo and the segregation of P at the prior austenite is eliminated. Due to this, it is possible to not only improve the grain boundary strength by Mo or Nb, but also keep down the reduction of the brittle strength of the grain boundaries.

As a third stage, by controlling the rate of rise of temperature at the time of heating for hot stamping, both the easily dissolvable fine carbides and high density dislocations are made nucleation sites for prior austenite. Due to this, it is possible to control the average grain size of the prior austenite at the hot stamped article to 3 μm or less.

Further, during heating, NbC, MoC are kept from precipitating and the solid solution ratio of one or both of Nb and Mo at the grain boundaries of the prior austenite are made to increase. To keep Mo, Nb from precipitating, it is necessary to make the rate of rise of temperature at the time of heating for hot stamping at least 100° C./s or more.

Below, the hot stamped article of the present invention and the method for manufacturing the same will be explained.

First, the reasons for limitation of the composition forming the hot stamped article of the present invention will be explained. Below, the % according to the composition means the mass %.

C: 0.35% to Less than 0.75%

C is an important element for obtaining a 2000 MPa or more tensile strength. With less than 0.35%, the martensite is soft and it is difficult to secure a 2000 MPa or more tensile strength, so C is made 0.35% or more, preferably 0.37% or more. In view of the balance of the demanded strength and suppression of early fracture, the upper limit is made 0.75%.

Si: 0.005% to 0.25%

Si is an element raising the deformability and contributing to improvement of the shock absorption. If less than 0.005%, the deformability is poor and the shock absorption deteriorates, so 0.005% or more is added, preferably 0.01% or more. On the other hand, if over 0.25%, the amount of formation of a solid solution in the carbides increases and carbides become harder to dissolve so the grain size of the prior austenite can no longer be controlled to 3 μm. Therefore, the upper limit is made 0.25%, preferably 0.22% or less.

Mn: 0.5% to 3.0%

Mn is an element contributing to improvement of strength by solution strengthening. If less than 0.5%, the solution strengthening ability is poor, the martensite becomes softer, and securing a 2000 MPa or more tensile strength is difficult, so 0.5% or more is added, preferably 0.7% or more. On the other hand, if adding over 3.0%, the amount of formation of a solid solution in the carbides increases and the carbides become harder to dissolve so the grain size of the prior austenite can no longer be controlled to 3 μm. Therefore, the upper limit is made 3.0%, preferably 2.5% or less.

Sol. Al: 0.0002% to 3.0%

Al is an element acting to deoxidize the molten steel and make the steel sounder. With less than 0.0002%, the deoxidation is sufficient, coarse oxides are formed, and early fracture is caused, so sol. Al is made 0.0002% or more. Preferably the content is 0.0010% or more. On the other hand, even if adding over 3.0%, coarse oxides are formed and early fracture is caused, so the content is made 3.0% or less, preferably 2.5% or less.

Cr: 0.05% to 1.00%

Cr is an element contributing to improvement of strength by solution strengthening. If less than 0.05%, the solution strengthening ability is poor, the martensite becomes soft, and a 2000 MPa or more tensile strength is difficult to secure, so 0.05% or more is added, preferably 0.1% or more. On the other hand, if adding over 1.00%, the amount of formation of a solid solution in the carbides increases and the carbides become harder to dissolve, so the grain size of the prior austenite can no longer be controlled to 3 μm. Therefore, the upper limit is made 1.00%, preferably 0.8% or less.

B: 0.0005% to 0.010%

B is an element contributing to improvement of strength by solution strengthening. If less than 0.0005%, the solution strengthening ability is poor, the martensite becomes soft, and a 2000 MPa or more tensile strength is difficult to secure, so 0.0005% or more is added, preferably 0.0008% or more. On the other hand, if adding over 0.010%, the amount of formation of a solid solution in the carbides increases and the carbides become harder to dissolve, so the grain size of the prior austenite can no longer be controlled to 3 μm. Therefore, the upper limit is made 0.010%, preferably 0.007% or less.

Nb: 0.01% to 0.15%

Nb is an element forming a solid solution at the grain boundaries of the prior austenite to raise the strength of the grain boundaries. Further, Nb obstructs the grain boundary segregation of P by forming a solid solution at the grain boundaries, so improves the brittle strength of the grain boundaries. For this reason, 0.01% or more is added, preferably 0.030% or more. On the other hand, if adding over 0.15%, it easily precipitates as carbides and the amount of formation of a solid solution at the grain boundaries ends up falling, so the content is made 0.15% or less, preferably 0.12% or less.

Mo: 0.005% to 1.00%

Mo is an element forming a solid solution at the grain boundaries of the prior austenite to raise the strength of the grain boundaries. Further, Mo obstructs the grain boundary segregation of P by forming a solid solution at the grain boundaries, so improves the brittle strength of the grain boundaries. For this reason, 0.005% or more is added, preferably 0.030% or more. On the other hand, if adding over 1.00%, it easily precipitates as carbides and the amount of formation of a solid solution at the grain boundaries ends up falling, so the content is made 1.00% or less, preferably 0.80% or less.

Ti: 0% to 0.15%

Ti is not an essential element, but is an element contributing to improvement of strength by solution strengthening, so may be added as needed. When adding Ti, to obtain the effect of addition, the content is preferably made 0.01% or more, more preferably 0.02%. On the other hand, if adding over 0.15%, coarse carbides and nitrides are formed and early fracture is caused, so the content is made 0.15% or less, preferably 0.12% or less.

Ni: 0% to 3.00%

Ni is not an essential element, but is an element contributing to improvement of strength by solution strengthening, so may be added as needed. When adding Ni, to obtain the effect of addition, the content is preferably made 0.01% or more, more preferably 0.02%. On the other hand, even if added in over 3.00%, the steel becomes brittle and early fracture is caused, so the content is made 3.00% or less, preferably 2.00% or less.

P: 0.10% or Less

P is an impurity and is an element easily segregating at the grain boundaries and lowering the brittle strength of the grain boundaries. If over 0.10%, the brittle strength of the grain boundaries remarkably falls and early fracture is caused, so P is made 0.10% or less, preferably 0.050% or less. The lower limit is not particularly prescribed, but if reducing this to less than 0.0001%, the dephosphorization cost greatly rises and the result becomes economically disadvantageous, so in practical steel sheet, 0.0001% is the substantive lower limit.

S: 0.10% or Less

S is an impurity element and is an element which forms inclusions. If over 0.10%, inclusions are formed and cause early fracture, so S is made 0.10% or less, preferably 0.0050% or less. The lower limit is not particularly prescribed, but if reducing the content to less than 0.0015%, the desulfurization cost greatly rises and the result becomes economically disadvantageous, so in practical steel sheet, 0.0015% is the substantive lower limit.

N: 0.010% or Less

N is an impurity element and is an element which forms nitrides and causes early fracture, so is made 0.010% or less, preferably 0.0075% or less. The lower limit is not particularly prescribed, but if reducing the content to less than 0.0001%, the denitridation cost greatly rises and the result becomes economically disadvantageous, so in practical steel sheet, 0.0001% is the substantive lower limit.

The balance of the composition is Fe and impurities. As impurities, elements which unavoidably enter from the steel raw materials or scrap and/or manufacturing process and which are allowed to an extent not obstructing the properties of the hot stamped article of the present invention may be illustrated.

Next, the reasons for limitation of the microstructures of the hot stamped article of the present invention will be explained.

Average Crystal Grain Size of Prior Austenite of 3.0 µm or Less

The grain size of the prior austenite is a structural factor important for securing excellent strength and the effect of suppressing early fracture. According to studies by the inventors, to obtain the shock absorption demanded from a hot stamped article, the grain size of the prior austenite is preferably as small as possible. The average grain size has to be controlled to 3.0 µm or less. More preferably, it is less than 2.7 µm, but the lower limit is not particularly prescribed. In current actual operations, making the size less than 0.5 µm is difficult, so 0.5 µm is the substantive lower limit.

The grain size of the prior austenite is measured as follows:

First, the hot stamped article is heat treated at 540° C. for 24 hr. Due to this, corrosion of the prior austenite grain boundaries is promoted. The heat treatment may be performed by furnace heating or electric heating. The rate of temperature rise is 0.1 to 100° C./s, and the cooling rate is made 0.1 to 150° C./s.

A cross-section vertical to the sheet surface is cut out from the center of the hot stamped article after heat treatment. #600 to #1500 silicon carbide paper is used to polish the measurement surface, then a solution of particle size 1 to 6 µm diamond powder dispersed in alcohol or another diluent or pure water is used to finish the sample to a mirror surface.

Next, the observed surface is immersed in a 3 to 4% sulfuric acid-alcohol (or water) solution for 1 minute to expose the prior austenite grain boundaries. At that time, the corrosion work is performed in an exhaust treatment apparatus. The temperature of the work atmosphere is made ordinary temperature.

The corroded sample is washed by acetone or ethyl alcohol, then dried and supplied to a scanning electron microscope for examination. The scanning electron microscope used is made one provided with a secondary electron detector.

The sample is irradiated by electron beams in a $9.6 \times 10^{-5}$ or less vacuum at an acceleration voltage of 15 kV at 13 levels of irradiation current to capture secondary electron images in the range of the ⅛ to ⅜ position about the sheet thickness ¼ position of the sample. The capture magnification is made 4000× based on a horizontal 386 mm×vertical 290 mm screen. The number of captured fields is made 10 fields or more.

In the captured secondary electron images, the prior austenite grain boundaries are captured as bright contrast. The average values of the shortest diameters and longest diameters of the prior austenite grains contained in the observed fields are calculated and used as the grain sizes. Except for prior austenite grains at the end parts of the captured fields etc. and other ones where the entire grains are not contained in the captured fields, the above operation is performed for all of the prior austenite grains and the average grain sizes in the captured fields are found. The "average grain size" is the value obtained by dividing the sum of the calculated grain sizes by the total number of prior austenite grains measured for grain size. This operation is performed for each of all of the captured fields to calculate the average grain size of the prior austenite.

Grain Boundary Solid Solution Ratio Z Defined by Formula (1) of 0.3 or More $$Z = \text{mass \% of one or both of Nb and Mo at grain boundaries/mass \% of one or both of Nb and Mo at dissolution} \quad (1)$$

The grain boundary solid solution ratio Z defined by the above formula (1) is a structural factor important in securing excellent shock absorption and is an indicator employed by the inventors for evaluating the shock absorption. If Nb and/or Mo forms a solid solution at the grain boundaries, it becomes hard for P to segregate at the grain boundaries and the cohesion at the grain boundaries rises, so the brittle strength of the grain boundaries rises and the shock absorption is improved. If the grain boundary solid solution ratio Z is less than 0.3, the effect of strengthening the grain boundaries of Nb and/or Mo cannot be sufficiently obtained and the required shock absorption cannot be obtained, so the grain boundary solid solution ratio Z is made 0.3 or more, preferably 0.4 or more. The upper limit is not particularly prescribed, but theoretically 1.0 becomes the upper limit.

The grain boundary solid solution ratio Z is measured as follows:

A test piece of the dimensions shown in FIG. 1 is prepared from the center part of the hot stamped article after heat treatment. At this time, the front and back surfaces of the test piece are machine ground to remove the same amounts to give a sheet thickness of 1.2 mm. The cut at the center part of the test piece is formed by insertion of a thickness 1 mm wire cutter. The connected part at the bottom of the cut is controlled to 100 μm to 200 μm.

Next, the test piece is immersed in a 20% ammonium thiocyanate solution for 72 to 120 hr.

Within 0.5 hr of the completion of immersion, the front and back surfaces of the test piece are galvanized.

After plating, the test piece is provided for Auger electron emission spectroscopy within 1.5 hr. The type of the apparatus for performing the Auger electron emission spectroscopy is not particularly limited. The test piece is set in the analysis apparatus and fractured in a $9.6 \times 10^{-5}$ or less vacuum from the cut part of the test piece to expose the prior austenite grain boundaries. The exposed prior austenite grain boundaries are irradiated by electron beams at a 1 to 30 kV acceleration voltage and measured for mass % (concentration) of Nb and/or Mo at the grain boundaries. The measurement is performed at 10 or more locations of the prior austenite grain boundaries. To prevent contamination of the grain boundaries, the measurement is completed within 30 minutes after fracture.

The average value of the mass % (concentration) of the obtained Nb and/or Mo is calculated and divided by the mass % of the added Nb and/or Mo. The value is made the grain boundary solid solution ratio Z.

Area Rate of 90% or More of Microstructures Comprised of At Least One of Lower Bainite, Martensite, and Tempered Martensite In order for the hot stamped article to be given a 1500 MPa or more tensile strength, the microstructures have to contain an area rate of 90% or more of martensite or tempered martensite, preferably 94% or more. From the viewpoint of securing the tensile strength, the microstructures may be lower bainite. An area rate of 90% or more of the structures may be comprised of any one of lower bainite, martensite, and tempered martensite or mixed structures of the same.

The balance of the microstructures is not particularly limited. For example, upper bainite, residual austenite, and pearlite may be mentioned.

The area rates of the lower bainite, martensite, and tempered martensite are measured as follows:

A cross-section vertical to the sheet surface is cut out from the center of the hot stamped article. #600 to #1500 silicon carbide paper is used to polish the measurement surface, then a solution of particle size 1 μm to 6 μm diamond powder dispersed in alcohol or another diluent or pure water is used to finish the sample to a mirror surface.

The sample is immersed in a 1.5 to 3% nitric acid-alcohol solution for 5 to 10 seconds to expose the high angle grain boundaries. At that time, the corrosion work is performed in an exhaust treatment apparatus. The temperature of the work atmosphere is made ordinary temperature.

The corroded sample is washed by acetone or ethyl alcohol, then dried and supplied to a scanning electron microscope for examination. The scanning electron microscope used is made one provided with a secondary electron detector. The sample is irradiated by electron beams in a $9.6 \times 10^{-5}$ or less vacuum at an acceleration voltage of 10 kV at eight levels of irradiation current to capture secondary electron images in the range of the ⅛ to ⅜ position about the sheet thickness ¼ position of the sample. The number of captured fields of a capture magnification of 10000× based on a horizontal 386 mm×vertical 290 mm screen is made 10 fields or more.

In the captured secondary images, the crystal grain boundaries and carbides are captured as bright contrast, so the positions of the crystal grain boundaries and carbides can be used to simply judge the structures. If carbides are formed inside the crystal grains, the structures are tempered martensite or lower bainite. If no carbides are observed inside the crystal grains, the structures are martensite.

On the other hand, the structures which the carbides form at the crystal grain boundaries are upper bainite or pearlite.

Residual austenite differs in crystal structure from the above microstructures, so a field the same as the position capturing the secondary electron image is measured by the electron backscatter diffraction method. The scanning electron microscope used is made one provided with a camera in which the electron backscatter diffraction method is possible. The sample is irradiated by electron beams in a $9.6 \times 10^{-5}$ or less vacuum at an acceleration voltage of 25 kV at 16 levels of irradiation current for measurement. A map of a face-centered cubic lattice is prepared from the obtained measurement data.

The capture magnification is made 10000× based on a horizontal 386 mm×vertical 290 mm screen. A mesh of 2 μm intervals is prepared on the captured photograph and the microstructures at the intersecting points of the mesh are determined. The value of the number of intersecting points of each structure divided by all intersecting points is made the area fraction of that microstructure. This operation is performed for 10 fields and the average value is calculated for use as the area ratio of the microstructure.

"Method for Manufacturing Steel Sheet for Hot Stamping Use"

Next, embodiments of the hot stamped article according to the present invention and the method for manufacture for obtaining the steel sheet for hot stamping use used for manufacture of the hot stamped article will be explained, but the present invention is not limited to the embodiments explained below.

Method for Manufacturing Steel Sheet for Hot Stamping Use (1) Continuous Casting Step Molten steel having the above-mentioned composition is made into a steel slab by the continuous casting method. In this continuous casting step, the amount of casting of molten steel per unit time is preferably made 6 ton/min or less. If the amount of casting of molten steel per unit time (casting rate) at the time of continuous casting is over 6 tons/min, microsegregation of Mn increases and the amount of nucleation of the precipitates mainly comprised of Mo and Nb ends up increasing. The amount of casting is more preferably made 5 ton/min or less. The lower limit of the amount of casting is not particularly limited, but from the viewpoint of the operating cost, the amount is preferably 0.1 ton/min or more.

(2) Hot Rolling Step

The above-mentioned steel slab is hot rolled to obtain a steel sheet. At that time, the hot rolling is ended in the A3 transformation temperature defined by formula (2)+10° C. to the A3 transformation temperature+200° C. in temperature region, the final rolling reduction at that time is made 12% or more, the cooling is started within 1 second after the end of finish rolling, the cooling is performed from the final rolling end temperature down to 550° C. in temperature region by a 100° C./s or more cooling rate, and the sheet is coiled at less than 500° C. in temperature.

$$A3 \text{ transformation temperature}=850+10\times(C+N)\times Mn+ 350\times Nb+250\times Ti+40\times B+10\times Cr+100\times Mo \quad \text{formula (2)}$$

By making the finish rolling temperature the A3 transformation temperature+10° C. or more, recrystallization of austenite is promoted. Due to this, formation of low angle grain boundaries in the crystal grains is suppressed and the sites for precipitation of Nb, Mo can be decreased. Further, by decreasing the sites for precipitation of Nb, Mo, the consumption of C can be suppressed, so in the later steps, it is possible to increase the number density of the carbides. Preferably, the temperature is made the A3 transformation temperature+30° C. or more.

By making the finish rolling temperature the A3 transformation temperature+200° C. or less, excessive grain growth of austenite is suppressed. By finish rolling at the A3 transformation temperature+200° C. or less in temperature region, recrystallization of austenite is promoted and still further excessive grain growth does not occur, so in the coiling step, it is possible to obtain fine carbides. Preferably the temperature is made the A3 transformation temperature+150° C. or less.

By making the rolling reduction of the finish rolling 12% or more, recrystallization of austenite is promoted. Due to this, formation of low angle grain boundaries in the crystal grains is suppressed and the number of sites of precipitation of Nb, Mo can be reduced. Preferably, it is made 15% or more.

By starting the cooling within 1 second after the end of finish rolling, preferably within 0.8 second, and cooling from the temperature at the end of the finish rolling down to 550° C. in temperature region by a 100° C./s or more cooling rate, it is possible to reduce the dwelling time in the temperature region at which precipitation of Nb and Mn is promoted. As a result, it is possible to suppress the precipitation of Nb and Mo in the austenite and the amount of solid solution of Nb and Mo at the austenite grain boundaries increases.

By making the coiling temperature less than 500° C., the above effect is improved and the concentration of Mn in the carbides is suppressed to thereby cause the formation of easily dissolvable fine carbides and further introduce high density dislocations into the steel. Preferably it is less than 480° C. The lower limit is not particularly prescribed, but coiling at room temperature or less is difficult in actual operation, so room temperature becomes the lower limit.

(3) Formation of Plated Layer

The surface of the softened layer may be formed with a plated layer for the purpose of improving the corrosion resistance etc. The plated layer may be either an electroplated layer and hot dip coated layer. As the electroplated layer, an electrogalvanized layer, electric Zn—Ni alloy plated layer, etc. may be illustrated. As the hot dip coated layer, a hot dip galvanized layer, hot dip galvannealed layer, hot dip aluminum plated layer, hot dip Zn—Al alloy coated layer, hot dip Zn—Al—Mg alloy coated layer, hot dip Zn—Al—Mg—Si alloy coated layer, etc. may be illustrated. The amount of deposition of the plated layer is not particularly limited and may be a general amount of deposition.

(4) Other Steps

In the manufacture of steel sheets for hot stamping use, in addition, pickling, cold rolling, temper rolling, and other known processes may be included.

Manufacturing Step of Hot Stamped Article

The hot stamped article of the present invention is manufactured by heating a steel sheet for hot stamping use to 500° C. to the A3 point in temperature region by a 100° C./s to less than 200° C./s average heating rate, holding it there, then hot stamping and shaping it, then cooling the shaped part down to room temperature.

Further, to adjust the strength, it is also possible to temper part of the regions or all of the regions of the hot stamped article at 200° C. to 500° C. in temperature.

By heating at 500° C. to the A3 point in temperature region by a 100° C./s to less than 200° C./s average heating rate, holding it, and hot stamping it, it is possible to use both the easily dissolvable fine carbides and high density dislocations as nucleation sites of prior austenite and control the average particle size of the prior austenite to 3 μm or less. Further, this suppresses the precipitation of NbC, MoC during heating and contributes to increase of the solid solution ratio of one or both of Nb and Mo at the grain boundaries of the prior austenite.

The average heating rate is preferably 120° C./s or more. If the average heating rate is over 200° C./s, transformation to austenite is promoted with the carbides remaining incompletely dissolved and deterioration of toughness is invited, so 200° C./s is made the upper limit, preferably less than 180° C./s.

The holding temperature of the hot stamping is preferably the A3 point+10° C. to the A3 point+150° C. Further, the cooling rate after hot stamping is preferably made 10° C./s or more.

EXAMPLES

Next, examples of the present invention will be explained, but the conditions in the examples are illustrations of conditions employed for confirming the workability and effects of the present invention. The present invention is not limited to these illustrations of conditions. The present invention can employ various conditions so long as realizing the object of the present invention without departing from the gist of the present invention.

The steel slabs manufactured by casting molten steels of the compositions shown in Tables 1-1 to 1-3 were hot rolled and cold rolled as shown in Tables 2-1 to 2-3 to produce steel sheets for hot stamping use. The steel sheets for hot stamping use were heat treated as shown in Table 2 and hot stamped to manufacture parts.

Tables 3-1 to 3-3 show the results of evaluation of the microstructures, strength, and shock absorption of the hot stamped articles.

TABLE 1-1

| Steel no. | C | Si | Mn | sol. Al | Cr | B | Nb | Mo | P | S | N | Ti | Ni | A3 (° C.) | Remarks |
|---|---|---|---|---|---|---|---|---|---|---|---|---|---|---|---|
| 1 | 0.28 | 0.05 | 1.1 | 0.040 | 1.00 | 0.0015 | 0.080 | 0.001 | 0.005 | 0.0020 | 0.0020 | 0.020 | | 876 | Comp. ex. |
| 2 | 0.32 | 0.22 | 1.6 | 0.045 | 0.05 | 0.0005 | 0.010 | 0.002 | 0.010 | 0.0040 | 0.0040 | | | 839 | Comp. ex. |
| 3 | 0.30 | 0.15 | 1.3 | 0.028 | 0.87 | 0.0015 | 0.015 | 0.210 | 0.007 | 0.0093 | 0.0024 | 0.015 | | 873 | Comp. ex. |
| 4 | 0.30 | 0.24 | 1.5 | 0.040 | 0.20 | 0.0050 | 0.080 | 0.001 | 0.011 | 0.0020 | 0.0041 | 0.050 | | 877 | Comp. ex. |
| 5 | 0.17 | 0.02 | 0.6 | 0.088 | 0.05 | 0.0013 | 0.020 | 0.001 | 0.068 | 0.0220 | 0.0019 | 0.010 | | 841 | Comp. ex. |
| 6 | 0.21 | 0.25 | 1.4 | 0.046 | 0.22 | 0.0021 | 0.015 | 0.018 | 0.015 | 0.0021 | 0.0033 | 0.025 | | 849 | Comp. ex. |
| 7 | 0.37 | 0.23 | 1.4 | 0.048 | 0.23 | 0.0018 | 0.019 | 0.017 | 0.012 | 0.0018 | 0.0034 | 0.023 | | 872 | Inv. ex. |
| 8 | 0.42 | 0.21 | 1.5 | 0.051 | 0.48 | 0.0023 | 0.084 | 0.012 | 0.012 | 0.0005 | 0.0032 | 0.029 | | 899 | Inv. ex. |
| 9 | 0.76 | 0.21 | 1.4 | 0.044 | 0.24 | 0.0021 | 0.048 | 0.011 | 0.012 | 0.0003 | 0.0036 | 0.030 | | 888 | Comp. ex. |
| 10 | 0.37 | 0.001 | 1.4 | 0.052 | 0.43 | 0.0025 | 0.088 | 0.011 | 0.015 | 0.0005 | 0.0029 | | | 871 | Comp. ex. |
| 11 | 0.36 | 0.008 | 1.4 | 0.047 | 0.44 | 0.0024 | 0.087 | 0.010 | 0.011 | 0.0004 | 0.0032 | | | 871 | Inv. ex. |
| 12 | 0.36 | 0.16 | 1.4 | 0.045 | 0.42 | 0.0024 | 0.086 | 0.011 | 0.013 | 0.0005 | 0.0032 | | | 871 | Inv. ex. |
| 13 | 0.38 | 0.22 | 1.5 | 0.046 | 0.43 | 0.0022 | 0.085 | 0.011 | 0.013 | 0.0005 | 0.0029 | | | 871 | Inv. ex. |
| 14 | 0.36 | 0.80 | 1.5 | 0.049 | 0.46 | 0.0024 | 0.086 | 0.011 | 0.014 | 0.0006 | 0.0030 | | | 871 | Comp. ex. |
| 15 | 0.38 | 0.20 | 0.3 | 0.044 | 0.50 | 0.0022 | 0.087 | 0.010 | 0.014 | 0.0006 | 0.0030 | | | 868 | Comp. ex. |
| 16 | 0.37 | 0.20 | 0.5 | 0.046 | 0.46 | 0.0022 | 0.087 | 0.013 | 0.013 | 0.0004 | 0.0032 | | | 868 | Inv. ex. |
| 17 | 0.37 | 0.18 | 1.3 | 0.050 | 0.43 | 0.0024 | 0.086 | 0.013 | 0.014 | 0.0005 | 0.0032 | | | 871 | Inv. ex. |
| 18 | 0.37 | 0.20 | 2.6 | 0.046 | 0.46 | 0.0024 | 0.086 | 0.011 | 0.011 | 0.0005 | 0.0032 | | | 876 | Inv. ex. |
| 19 | 0.36 | 0.18 | 3.6 | 0.048 | 0.42 | 0.0025 | 0.085 | 0.011 | 0.014 | 0.0004 | 0.0031 | | | 878 | Comp. ex. |
| 20 | 0.37 | 0.20 | 1.5 | 0.0001 | 0.46 | 0.0022 | 0.086 | 0.010 | 0.015 | 0.0005 | 0.0032 | | | 871 | Comp. ex. |
| 21 | 0.37 | 0.18 | 1.4 | 0.0008 | 0.45 | 0.0024 | 0.088 | 0.010 | 0.011 | 0.0005 | 0.0031 | | | 872 | Inv. ex. |
| 22 | 0.37 | 0.21 | 1.4 | 0.043 | 0.45 | 0.0023 | 0.086 | 0.013 | 0.013 | 0.0004 | 0.0032 | | | 871 | Inv. ex. |
| 23 | 0.38 | 0.18 | 1.5 | 2.8 | 0.43 | 0.0024 | 0.086 | 0.013 | 0.015 | 0.0003 | 0.0029 | | | 872 | Inv. ex. |
| 24 | 0.36 | 0.20 | 1.5 | 3.7 | 0.44 | 0.0022 | 0.088 | 0.011 | 0.014 | 0.0005 | 0.0031 | | | 872 | Comp. ex. |
| 25 | 0.38 | 0.21 | 1.5 | 0.052 | 0.03 | 0.0025 | 0.084 | 0.013 | 0.014 | 0.0003 | 0.0032 | | | 867 | Comp. ex. |
| 26 | 0.38 | 0.21 | 1.4 | 0.050 | 0.08 | 0.0024 | 0.086 | 0.010 | 0.013 | 0.0003 | 0.0029 | | | 867 | Inv. ex. |
| 27 | 0.36 | 0.19 | 1.5 | 0.046 | 0.41 | 0.0022 | 0.087 | 0.013 | 0.015 | 0.0006 | 0.0029 | | | 871 | Inv. ex. |
| 28 | 0.36 | 0.20 | 1.4 | 0.049 | 0.90 | 0.0024 | 0.088 | 0.013 | 0.015 | 0.0006 | 0.0029 | | | 876 | Inv. ex. |
| 29 | 0.38 | 0.20 | 1.4 | 0.051 | 1.20 | 0.0024 | 0.084 | 0.010 | 0.015 | 0.0003 | 0.0029 | | | 878 | Comp. ex. |
| 30 | 0.37 | 0.21 | 1.4 | 0.047 | 0.46 | 0.0002 | 0.087 | 0.011 | 0.013 | 0.0006 | 0.0029 | | | 871 | Comp. ex. |
| 31 | 0.36 | 0.18 | 1.4 | 0.050 | 0.44 | 0.0005 | 0.087 | 0.012 | 0.013 | 0.0006 | 0.0030 | | | 871 | Inv. ex. |
| 32 | 0.36 | 0.18 | 1.4 | 0.050 | 0.49 | 0.0024 | 0.088 | 0.010 | 0.012 | 0.0005 | 0.0029 | | | 872 | Inv. ex. |
| 33 | 0.36 | 0.19 | 1.4 | 0.048 | 0.47 | 0.0080 | 0.085 | 0.013 | 0.015 | 0.0006 | 0.0031 | | | 871 | Inv. ex. |
| 34 | 0.36 | 0.19 | 1.5 | 0.052 | 0.43 | 0.0140 | 0.086 | 0.010 | 0.014 | 0.0006 | 0.0032 | | | 871 | Comp. ex. |
| 35 | 0.38 | 0.18 | 1.5 | 0.051 | 0.49 | 0.0024 | 0.008 | 0.013 | 0.011 | 0.0005 | 0.0031 | | | 845 | Comp. ex. |
| 36 | 0.36 | 0.20 | 1.5 | 0.052 | 0.42 | 0.0023 | 0.021 | 0.010 | 0.013 | 0.0006 | 0.0031 | | | 848 | Inv. ex. |
| 37 | 0.37 | 0.19 | 1.4 | 0.045 | 0.47 | 0.0023 | 0.084 | 0.010 | 0.012 | 0.0006 | 0.0030 | | | 870 | Inv. ex. |
| 38 | 0.36 | 0.21 | 1.5 | 0.046 | 0.45 | 0.0022 | 0.14 | 0.013 | 0.014 | 0.0006 | 0.0030 | | | 890 | Inv. ex. |
| 39 | 0.36 | 0.21 | 1.4 | 0.051 | 0.44 | 0.0022 | 0.18 | 0.012 | 0.011 | 0.0006 | 0.0031 | | | 904 | Comp. ex. |
| 40 | 0.38 | 0.19 | 1.4 | 0.052 | 0.48 | 0.0025 | 0.087 | 0.002 | 0.014 | 0.0006 | 0.0029 | | | 871 | Comp. ex. |
| 41 | 0.37 | 0.20 | 1.5 | 0.044 | 0.50 | 0.0024 | 0.084 | 0.015 | 0.013 | 0.0005 | 0.0030 | | | 872 | Inv. ex. |
| 42 | 0.38 | 0.18 | 1.5 | 0.050 | 0.46 | 0.0023 | 0.087 | 0.010 | 0.012 | 0.0006 | 0.0030 | | | 872 | Inv. ex. |
| 43 | 0.38 | 0.20 | 1.5 | 0.052 | 0.47 | 0.0023 | 0.088 | 0.82 | 0.013 | 0.0006 | 0.0032 | | | 953 | Inv. ex. |
| 44 | 0.37 | 0.19 | 1.5 | 0.044 | 0.46 | 0.0022 | 0.085 | 1.24 | 0.015 | 0.0005 | 0.0031 | | | 994 | Comp. ex. |
| 45 | 0.38 | 0.20 | 1.4 | 0.047 | 0.44 | 0.0022 | 0.085 | 0.010 | 0.011 | 0.0006 | 0.0031 | | | 871 | Inv. ex. |
| 46 | 0.36 | 0.18 | 1.4 | 0.047 | 0.44 | 0.0022 | 0.084 | 0.010 | 0.130 | 0.0003 | 0.0029 | | | 870 | Comp. ex. |
| 47 | 0.38 | 0.17 | 1.4 | 0.051 | 0.49 | 0.0022 | 0.087 | 0.011 | 0.011 | 0.0003 | 0.0030 | | | 872 | Inv. ex. |
| 48 | 0.38 | 0.19 | 1.5 | 0.048 | 0.46 | 0.0024 | 0.087 | 0.011 | 0.013 | 0.12 | 0.0030 | | | 872 | Comp. ex. |
| 49 | 0.37 | 0.19 | 1.5 | 0.045 | 0.43 | 0.0024 | 0.087 | 0.013 | 0.014 | 0.0004 | 0.0030 | | | 872 | Inv. ex. |
| 50 | 0.36 | 0.20 | 1.4 | 0.049 | 0.42 | 0.0022 | 0.084 | 0.011 | 0.014 | 0.0006 | 0.025 | | | 870 | Comp. ex. |
| 51 | 0.37 | 0.19 | 1.5 | 0.045 | 0.48 | 0.0022 | 0.085 | 0.011 | 0.013 | 0.0004 | 0.0032 | 0.082 | | 892 | Inv. ex. |
| 52 | 0.36 | 0.19 | 1.5 | 0.047 | 0.49 | 0.0024 | 0.088 | 0.010 | 0.014 | 0.0006 | 0.0029 | | 0.2 | 872 | Inv. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Inv. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Inv. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Comp. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Comp. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Inv. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Inv. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Comp. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Comp. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Inv. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Inv. ex. |

TABLE 1-1-continued

| Steel no. | C | Si | Mn | sol. Al | Cr | B | Nb | Mo | P | S | N | Ti | Ni | A3 (° C.) | Remarks |
|---|---|---|---|---|---|---|---|---|---|---|---|---|---|---|---|
| 7 | 0.37 | 0.23 | 1.4 | 0.048 | 0.23 | 0.0018 | 0.019 | 0.017 | 0.012 | 0.0018 | 0.0034 | 0.023 | | 852 | Inv. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Inv. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Comp. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Comp. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Inv. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Inv. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Inv. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Inv. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Comp. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Inv. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Inv. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Inv. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Inv. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Comp. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Inv. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Inv. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Inv. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Comp. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Inv. ex. |
| 7 | 0.37 | 0.23 | 1.4 | 0.048 | 0.23 | 0.0018 | 0.019 | 0.017 | 0.012 | 0.0018 | 0.0034 | 0.023 | | 852 | Inv. ex. |

TABLE 2-1

| | | Continuous casting step | Hot rolling step | | | | | Cold rolling | Plating | | |
|---|---|---|---|---|---|---|---|---|---|---|---|
| Steel no. | Man no. | Amount of molten steel cast (ton/min) | Finish rolling temp. (° C.) | Finish rolling rate (%) | Cold start time (sec) | Cooling rate (° C./s) | Coiling start temp. (° C.) | Cold rolling reduction (%) | Plating | Alloying after plating | Remarks |
| 1 | 1 | 4.4 | 910 | 15 | 0.9 | 115 | 510 | 54 | None | None | Comp. ex. |
| 2 | 2 | 7.9 | 858 | 14 | 0.9 | 121 | 453 | 67 | None | None | Comp. ex. |
| 3 | 3 | 7.9 | 896 | 16 | 0.8 | 116 | 552 | 54 | None | None | Comp. ex. |
| 4 | 4 | 7.2 | 904 | 14 | 0.8 | 115 | 475 | 55 | None | None | Comp. ex. |
| 5 | 5 | 7.9 | 898 | 17 | 0.8 | 198 | 625 | 55 | None | None | Comp. ex. |
| 6 | 6 | 4.3 | 910 | 15 | 0.9 | 123 | 474 | 56 | None | None | Comp. ex. |
| 7 | 7 | 4.1 | 908 | 17 | 0.9 | 121 | 469 | 54 | None | None | Inv. ex. |
| 8 | 8 | 4.0 | 901 | 17 | 0.8 | 117 | 465 | 55 | None | None | Inv. ex. |
| 9 | 9 | 4.2 | 910 | 17 | 0.9 | 120 | 468 | 56 | None | None | Comp. ex. |
| 10 | 10 | 4.2 | 902 | 16 | 0.8 | 117 | 468 | 57 | None | None | Comp. ex. |
| 11 | 11 | 4.2 | 906 | 15 | 0.9 | 123 | 472 | 54 | None | None | Inv. ex. |
| 12 | 12 | 4.4 | 910 | 16 | 0.9 | 122 | 471 | 55 | None | None | Inv. ex. |
| 13 | 13 | 4.3 | 899 | 14 | 0.9 | 119 | 464 | 57 | None | None | Inv. ex. |
| 14 | 14 | 4.2 | 905 | 16 | 0.8 | 125 | 466 | 54 | None | None | Comp. ex. |
| 15 | 15 | 4.1 | 895 | 14 | 0.9 | 119 | 462 | 54 | None | None | Comp. ex. |
| 16 | 16 | 4.0 | 907 | 16 | 0.9 | 125 | 472 | 58 | None | None | Inv. ex. |
| 17 | 17 | 4.3 | 902 | 14 | 0.9 | 115 | 473 | 56 | None | None | Inv. ex. |
| 18 | 18 | 4.3 | 903 | 15 | 0.9 | 115 | 475 | 55 | None | None | Inv. ex. |
| 19 | 19 | 4.1 | 897 | 16 | 0.8 | 122 | 460 | 58 | None | None | Comp. ex. |
| 20 | 20 | 4.3 | 905 | 17 | 0.9 | 117 | 465 | 57 | None | None | Comp. ex. |
| 21 | 21 | 4.1 | 903 | 17 | 0.7 | 117 | 474 | 57 | None | None | Inv. ex. |
| 22 | 22 | 4.2 | 899 | 15 | 0.8 | 118 | 473 | 57 | None | None | Inv. ex. |
| 23 | 23 | 4.0 | 895 | 17 | 0.7 | 124 | 475 | 54 | None | None | Inv. ex. |
| 24 | 24 | 4.3 | 896 | 15 | 0.7 | 124 | 469 | 57 | None | None | Comp. ex. |
| 25 | 25 | 4.3 | 910 | 14 | 0.8 | 121 | 465 | 55 | None | None | Comp. ex. |
| 26 | 26 | 4.3 | 910 | 15 | 0.8 | 121 | 464 | 54 | None | None | Inv. ex. |
| 27 | 27 | 4.3 | 907 | 17 | 0.7 | 117 | 463 | 55 | None | None | Inv. ex. |
| 28 | 28 | 4.0 | 907 | 15 | 0.7 | 119 | 475 | 56 | None | None | Inv. ex. |
| 29 | 29 | 4.0 | 897 | 15 | 0.7 | 119 | 467 | 55 | None | None | Comp. ex. |
| 30 | 30 | 4.3 | 896 | 16 | 0.7 | 116 | 469 | 57 | None | None | Comp. ex. |
| 31 | 31 | 3.9 | 896 | 14 | 0.7 | 115 | 469 | 56 | None | None | Inv. ex. |
| 32 | 32 | 3.9 | 909 | 15 | 0.8 | 119 | 463 | 54 | None | None | Inv. ex. |
| 33 | 33 | 4.0 | 905 | 15 | 0.9 | 125 | 472 | 58 | None | None | Inv. ex. |
| 34 | 34 | 4.2 | 907 | 16 | 0.8 | 118 | 466 | 58 | None | None | Comp. ex. |
| 35 | 35 | 3.9 | 897 | 17 | 0.9 | 125 | 471 | 56 | None | None | Comp. ex. |
| 36 | 36 | 4.4 | 908 | 16 | 0.7 | 121 | 465 | 58 | None | None | Inv. ex. |
| 37 | 37 | 3.9 | 910 | 17 | 0.7 | 117 | 469 | 56 | None | None | Inv. ex. |
| 38 | 38 | 4.0 | 909 | 17 | 0.9 | 122 | 474 | 58 | None | None | Inv. ex. |
| 39 | 39 | 4.4 | 949 | 15 | 0.7 | 122 | 472 | 58 | None | None | Comp. ex. |
| 40 | 40 | 4.3 | 899 | 17 | 0.8 | 124 | 470 | 57 | None | None | Comp. ex. |
| 41 | 41 | 3.9 | 906 | 14 | 0.7 | 121 | 466 | 58 | None | None | Inv. ex. |

TABLE 2-1-continued

| Steel no. | Man no. | Continuous casting step Amount of molten steel cast (ton/min) | Hot rolling step Finish rolling temp. (° C.) | Finish rolling rate (%) | Cold start time (sec) | Cooling rate (° C./s) | Coiling start temp. (° C.) | Cold rolling reduction (%) | Plating Plating | Alloying after plating | Remarks |
|---|---|---|---|---|---|---|---|---|---|---|---|
| 42 | 42 | 4.1 | 895 | 17 | 0.9 | 124 | 464 | 58 | None | None | Inv. ex. |
| 43 | 43 | 4.4 | 965 | 15 | 0.9 | 117 | 470 | 54 | None | None | Inv. ex. |
| 44 | 44 | 3.9 | 1005 | 14 | 0.9 | 124 | 468 | 56 | None | None | Comp. ex. |
| 45 | 45 | 4.4 | 902 | 16 | 0.9 | 118 | 465 | 54 | None | None | Inv. ex. |
| 46 | 46 | 4.3 | 906 | 16 | 0.8 | 119 | 468 | 55 | None | None | Comp. ex. |
| 47 | 47 | 4.0 | 898 | 15 | 0.8 | 121 | 469 | 58 | None | None | Inv. ex. |
| 48 | 48 | 4.3 | 905 | 15 | 0.9 | 121 | 471 | 55 | None | None | Comp. ex. |
| 49 | 49 | 3.9 | 905 | 14 | 0.9 | 119 | 467 | 55 | None | None | Inv. ex. |
| 50 | 50 | 4.0 | 910 | 15 | 0.7 | 121 | 468 | 55 | None | None | Comp. ex. |
| 51 | 51 | 4.3 | 904 | 14 | 0.9 | 115 | 460 | 57 | None | None | Inv. ex. |
| 52 | 52 | 3.9 | 898 | 15 | 0.9 | 117 | 470 | 57 | None | None | Inv. ex. |
| 7 | 53 | 3.0 | 903 | 15 | 0.9 | 117 | 460 | 55 | None | None | Inv. ex. |
| 7 | 54 | 5.0 | 896 | 15 | 0.7 | 124 | 471 | 54 | None | None | Inv. ex. |
| 7 | 55 | 8.4 | 910 | 16 | 0.9 | 121 | 471 | 56 | None | None | Comp. ex. |
| 7 | 56 | 3.9 | 855 | 14 | 0.8 | 123 | 468 | 57 | None | None | Comp. ex. |
| 7 | 57 | 4.2 | 898 | 15 | 0.9 | 119 | 463 | 55 | None | None | Inv. ex. |
| 7 | 58 | 4.0 | 905 | 16 | 0.7 | 115 | 469 | 57 | None | None | Inv. ex. |
| 7 | 59 | 4.1 | 999 | 16 | 0.8 | 120 | 461 | 57 | None | None | Inv. ex. |
| 7 | 60 | 4.2 | 1145 | 16 | 0.9 | 117 | 462 | 58 | None | None | Comp. ex. |
| 7 | 61 | 4.2 | 905 | 9 | 0.7 | 123 | 463 | 56 | None | None | Comp. ex. |
| 7 | 62 | 4.2 | 906 | 12 | 0.9 | 119 | 473 | 57 | None | None | Inv. ex. |
| 7 | 63 | 4.0 | 909 | 17 | 0.7 | 120 | 473 | 54 | None | None | Inv. ex. |
| 7 | 64 | 4.0 | 903 | 16 | 0.9 | 125 | 475 | 55 | None | None | Inv. ex. |
| 7 | 65 | 4.1 | 895 | 16 | 0.8 | 122 | 465 | 54 | None | None | Inv. ex. |
| 7 | 66 | 3.9 | 908 | 17 | 2.0 | 125 | 467 | 57 | None | None | Comp. ex. |
| 7 | 67 | 4.0 | 896 | 14 | 0.9 | 88 | 472 | 57 | None | None | Comp. ex. |
| 7 | 68 | 4.2 | 899 | 14 | 0.8 | 110 | 463 | 55 | None | None | Inv. ex. |
| 7 | 69 | 4.1 | 896 | 16 | 0.9 | 119 | 471 | 57 | None | None | Inv. ex. |
| 7 | 70 | 4.0 | 908 | 16 | 0.7 | 117 | 56 | 56 | None | None | Inv. ex. |
| 7 | 71 | 3.9 | 909 | 17 | 0.9 | 117 | 467 | 58 | None | None | Inv. ex. |
| 7 | 72 | 4.2 | 897 | 17 | 0.9 | 120 | 480 | 54 | None | None | Inv. ex. |
| 7 | 73 | 4.1 | 898 | 15 | 0.7 | 125 | 543 | 56 | None | None | Comp. ex. |
| 7 | 74 | 4.3 | 901 | 16 | 0.7 | 123 | 469 | 0 | None | None | Inv. ex. |
| 7 | 75 | 3.9 | 898 | 14 | 0.7 | 119 | 464 | 57 | Yes | None | Inv. ex. |
| 7 | 76 | 4.1 | 898 | 14 | 0.7 | 121 | 463 | 54 | Yes | Yes | Inv. ex. |
| 7 | 77 | 4.1 | 895 | 15 | 0.9 | 123 | 467 | 55 | None | None | Inv. ex. |
| 7 | 78 | 4.4 | 906 | 16 | 0.8 | 118 | 463 | 58 | None | None | Comp. ex. |
| 7 | 79 | 4.1 | 910 | 16 | 0.9 | 121 | 467 | 54 | None | None | Inv. ex. |
| 7 | 80 | 4.1 | 905 | 14 | 0.8 | 124 | 460 | 56 | None | None | Inv. ex. |
| 7 | 81 | 3.9 | 903 | 14 | 0.9 | 120 | 470 | 57 | None | None | Inv. ex. |
| 7 | 82 | 4.3 | 898 | 16 | 0.8 | 117 | 469 | 55 | None | None | Comp. ex. |
| 7 | 83 | 4.1 | 904 | 14 | 0.8 | 118 | 462 | 58 | None | None | Inv. ex. |
| 7 | 84 | 3.9 | 908 | 17 | 0.7 | 118 | 460 | 54 | None | None | Inv. ex. |

TABLE 3-1

| Steel no. | Man. no. | Heat treatment step Heating rate (° C./s) | Holding temp. (° C.) | Cooling rate (° C.) | Tempering temp. (° C.) | Metal structure of hot stamped article Average crystal grain size of prior austenite (μm) | Area rate of lower bainite, martensite, or tempered martensite (%) |
|---|---|---|---|---|---|---|---|
| 1 | 1 | 162 | 896 | 55 | | 3.0 | 95 |
| 2 | 2 | 87 | 855 | 60 | | 7.0 | 100 |
| 3 | 3 | 20 | 929 | 55 | | 5.6 | 100 |
| 4 | 4 | 178 | 930 | 50 | | 3.1 | 100 |
| 5 | 5 | 161 | 864 | 50 | | 2.5 | 100 |
| 6 | 6 | 161 | 901 | 55 | | 2.7 | 62 |
| 7 | 7 | 178 | 899 | 55 | | 2.6 | 95 |
| 8 | 8 | 173 | 929 | 55 | | 1.9 | 97 |
| 9 | 9 | 173 | 928 | 55 | | 1.6 | 99 |
| 10 | 10 | 166 | 915 | 55 | | 1.8 | 98 |
| 11 | 11 | 183 | 921 | 55 | | 2.1 | 97 |
| 12 | 12 | 185 | 924 | 55 | | 1.8 | 97 |
| 13 | 13 | 172 | 898 | 55 | | 2.3 | 97 |
| 14 | 14 | 171 | 931 | 55 | | 4.5 | 97 |
| 15 | 15 | 167 | 887 | 55 | | 1.8 | 63 |

TABLE 3-1-continued

| | | | | | | | |
|---|---|---|---|---|---|---|---|
| 16 | 16 | 156 | 884 | 55 | | 2.0 | 98 |
| 17 | 17 | 180 | 898 | 55 | | 2.1 | 98 |
| 18 | 18 | 184 | 911 | 55 | | 2.1 | 98 |
| 19 | 19 | 183 | 904 | 55 | | 4.3 | 98 |
| 20 | 20 | 164 | 887 | 55 | | 1.8 | 98 |
| 21 | 21 | 170 | 908 | 55 | | 1.9 | 97 |
| 22 | 22 | 159 | 923 | 55 | | 2.1 | 98 |
| 23 | 23 | 155 | 913 | 55 | | 1.9 | 98 |
| 24 | 24 | 175 | 899 | 55 | | 1.8 | 97 |
| 25 | 25 | 183 | 920 | 55 | | 2.1 | 62 |
| 26 | 26 | 182 | 912 | 55 | | 2.2 | 98 |
| 27 | 27 | 169 | 900 | 55 | | 2.5 | 98 |
| 28 | 28 | 174 | 904 | 55 | | 2.7 | 97 |
| 29 | 29 | 161 | 929 | 55 | | 4.5 | 98 |
| 30 | 30 | 159 | 897 | 55 | | 1.9 | 62 |
| 31 | 31 | 181 | 904 | 55 | | 2.4 | 98 |
| 32 | 32 | 181 | 888 | 55 | | 2.4 | 98 |
| 33 | 33 | 156 | 911 | 55 | | 2.8 | 97 |
| 34 | 34 | 160 | 913 | 55 | | 4.3 | 98 |
| 35 | 35 | 185 | 883 | 55 | | 1.9 | 98 |
| 36 | 36 | 182 | 899 | 55 | | 2.1 | 97 |
| 37 | 37 | 181 | 910 | 55 | | 2.0 | 98 |
| 38 | 38 | 167 | 948 | 55 | | 2.1 | 98 |
| 39 | 39 | 176 | 964 | 55 | | 2.0 | 98 |
| 40 | 40 | 177 | 905 | 55 | | 2.1 | 98 |
| 41 | 41 | 175 | 904 | 55 | | 2.0 | 98 |
| 42 | 42 | 160 | 909 | 55 | | 2.1 | 98 |
| 43 | 43 | 166 | 978 | 55 | | 2.0 | 97 |
| 44 | 44 | 182 | 1029 | 55 | | 1.8 | 97 |
| 45 | 45 | 185 | 919 | 55 | | 1.9 | 97 |
| 46 | 46 | 166 | 901 | 55 | | 1.8 | 97 |
| 47 | 47 | 185 | 887 | 55 | | 2.1 | 98 |
| 48 | 48 | 160 | 902 | 55 | | 2.0 | 97 |
| 49 | 49 | 168 | 905 | 55 | | 2.0 | 97 |
| 50 | 50 | 162 | 911 | 55 | | 2.1 | 97 |
| 51 | 51 | 165 | 921 | 55 | | 1.8 | 97 |
| 52 | 52 | 157 | 910 | 55 | | 2.0 | 98 |
| 7 | 53 | 165 | 887 | 55 | | 2.1 | 98 |
| 7 | 54 | 170 | 878 | 55 | | 2.6 | 97 |
| 7 | 55 | 174 | 886 | 55 | | 2.4 | 98 |
| 7 | 56 | 185 | 868 | 55 | | 7.0 | 97 |
| 7 | 57 | 156 | 898 | 55 | | 2.1 | 98 |
| 7 | 58 | 178 | 873 | 55 | | 2.1 | 97 |
| 7 | 59 | 156 | 903 | 55 | | 2.8 | 97 |
| 7 | 60 | 179 | 890 | 55 | | 4.3 | 97 |
| 7 | 61 | 175 | 907 | 55 | | 1.8 | 97 |
| 7 | 62 | 163 | 891 | 55 | | 2.0 | 98 |
| 7 | 63 | 157 | 875 | 55 | | 1.9 | 98 |
| 7 | 64 | 174 | 880 | 55 | | 1.8 | 97 |
| 7 | 65 | 158 | 875 | 55 | | 1.8 | 97 |
| 7 | 66 | 185 | 892 | 55 | | 1.8 | 98 |
| 7 | 67 | 182 | 882 | 55 | | 2.1 | 97 |
| 7 | 68 | 162 | 896 | 55 | | 2.0 | 98 |
| 7 | 69 | 182 | 872 | 55 | | 2.0 | 97 |
| 7 | 70 | 166 | 867 | 55 | | 1.8 | 98 |
| 7 | 71 | 180 | 896 | 55 | | 1.8 | 98 |
| 7 | 72 | 183 | 880 | 55 | | 2.5 | 98 |
| 7 | 73 | 176 | 882 | 55 | | 4.2 | 98 |
| 7 | 74 | 183 | 874 | 55 | | 1.9 | 97 |
| 7 | 75 | 164 | 908 | 55 | | 1.9 | 97 |
| 7 | 76 | 171 | 877 | 55 | | 1.9 | 97 |
| 7 | 77 | 172 | 871 | 55 | 187 | 2.1 | 98 |
| 7 | 78 | 87 | 891 | 55 | | 4.5 | 98 |
| 7 | 79 | 133 | 872 | 55 | | 2.5 | 98 |
| 7 | 80 | 161 | 875 | 55 | | 1.8 | 97 |
| 7 | 81 | 193 | 901 | 55 | | 1.6 | 97 |
| 7 | 82 | 229 | 907 | 55 | | 2.0 | 98 |
| 7 | 83 | 166 | 903 | 55 | | 2.0 | 98 |
| 7 | 84 | 183 | 889 | 55 | | 2.0 | 97 |

| | | Metal structure of hot stamped article | | Mechanical properties | | | |
|---|---|---|---|---|---|---|---|
| | Steel no. | Type of structure | Grain boundary solid solution ratio Z | Max. strength (MPa) | Vickers hardness (Hv) | Max. strength/ Vickers hardness *3.3 | Remarks |
| | 1 | Martensite | 0.1 | 1922 | 809 | 0.72 | Comp. ex. |
| | 2 | Martensite | 0.2 | 1670 | 675 | 0.75 | Comp. ex. |
| | 3 | Martensite | 0.2 | 1755 | 771 | 0.69 | Comp. ex. |
| | 4 | Martensite | 0.2 | 1971 | 776 | 0.77 | Comp. ex. |

TABLE 3-1-continued

| | | | | | | |
|---|---|---|---|---|---|---|
| 5 | Martensite | 0.2 | 1160 | 533 | 0.66 | Comp. ex. |
| 6 | Martensite | 0.5 | 1373 | 432 | 0.96 | Comp. ex. |
| 7 | Martensite | 0.5 | 2052 | 637 | 0.98 | Inv. ex. |
| 8 | Martensite | 0.5 | 2228 | 692 | 0.98 | Inv. ex. |
| 9 | Martensite | 0.4 | 1518 | 641 | 0.72 | Comp. ex. |
| 10 | Martensite | 0.4 | 2106 | 751 | 0.85 | Comp. ex. |
| 11 | Martensite | 0.4 | 2127 | 661 | 0.98 | Inv. ex. |
| 12 | Martensite | 0.4 | 2257 | 703 | 0.97 | Inv. ex. |
| 13 | Martensite | 0.4 | 2015 | 630 | 0.97 | Inv. ex. |
| 14 | Martensite | 0.5 | 1546 | 640 | 0.73 | Comp. ex. |
| 15 | Martensite | 0.5 | 1522 | 480 | 0.96 | Comp. ex. |
| 16 | Martensite | 0.4 | 2103 | 656 | 0.97 | Inv. ex. |
| 17 | Martensite | 0.4 | 2226 | 692 | 0.97 | Inv. ex. |
| 18 | Martensite | 0.4 | 2075 | 647 | 0.97 | Inv. ex. |
| 19 | Martensite | 0.4 | 1780 | 642 | 0.84 | Comp. ex. |
| 20 | Martensite | 0.4 | 1651 | 649 | 0.77 | Comp. ex. |
| 21 | Martensite | 0.5 | 2123 | 656 | 0.98 | Inv. ex. |
| 22 | Martensite | 0.4 | 2263 | 698 | 0.98 | Inv. ex. |
| 23 | Martensite | 0.4 | 2032 | 628 | 0.98 | Inv. ex. |
| 24 | Martensite | 0.5 | 1614 | 640 | 0.76 | Comp. ex. |
| 25 | Martensite | 0.6 | 1546 | 480 | 0.98 | Comp. ex. |
| 26 | Martensite | 0.4 | 2061 | 644 | 0.97 | Inv. ex. |
| 27 | Martensite | 0.4 | 2250 | 701 | 0.97 | Inv. ex. |
| 28 | Martensite | 0.5 | 2207 | 689 | 0.97 | Inv. ex. |
| 29 | Martensite | 0.5 | 1790 | 645 | 0.84 | Comp. ex. |
| 30 | Martensite | 0.5 | 1511 | 480 | 0.95 | Comp. ex. |
| 31 | Martensite | 0.4 | 2065 | 642 | 0.98 | Inv. ex. |
| 32 | Martensite | 0.5 | 2133 | 664 | 0.97 | Inv. ex. |
| 33 | Martensite | 0.4 | 2015 | 622 | 0.98 | Inv. ex. |
| 34 | Martensite | 0.4 | 1610 | 640 | 0.76 | Comp. ex. |
| 35 | Martensite | 0.2 | 1700 | 640 | 0.80 | Comp. ex. |
| 36 | Martensite | 0.5 | 2116 | 660 | 0.97 | Inv. ex. |
| 37 | Martensite | 0.5 | 2308 | 715 | 0.98 | Inv. ex. |
| 38 | Martensite | 0.7 | 2120 | 658 | 0.98 | Inv. ex. |
| 39 | Martensite | 0.2 | 1710 | 645 | 0.80 | Comp. ex. |
| 40 | Martensite | 0.1 | 1728 | 646 | 0.81 | Comp. ex. |
| 41 | Martensite | 0.5 | 2000 | 626 | 0.97 | Inv. ex. |
| 42 | Martensite | 0.6 | 2234 | 696 | 0.97 | Inv. ex. |
| 43 | Martensite | 0.6 | 2038 | 637 | 0.97 | Inv. ex. |
| 44 | Martensite | 0.2 | 1690 | 649 | 0.79 | Comp. ex. |
| 45 | Martensite | 0.5 | 2087 | 649 | 0.98 | Inv. ex. |
| 46 | Martensite | 0.4 | 1591 | 640 | 0.75 | Comp. ex. |
| 47 | Martensite | 0.4 | 2178 | 674 | 0.98 | Inv. ex. |
| 48 | Martensite | 0.5 | 1571 | 648 | 0.73 | Comp. ex. |
| 49 | Martensite | 0.5 | 2205 | 690 | 0.97 | Inv. ex. |
| 50 | Martensite | 0.4 | 1649 | 644 | 0.78 | Comp. ex. |
| 51 | Martensite | 0.5 | 2356 | 728 | 0.98 | Inv. ex. |
| 52 | Martensite | 0.4 | 2139 | 666 | 0.97 | Inv. ex. |
| 7 | Martensite | 0.5 | 2178 | 674 | 0.98 | Inv. ex. |
| 7 | Martensite | 0.4 | 2369 | 740 | 0.97 | Inv. ex. |
| 7 | Martensite | 0.2 | 1598 | 641 | 0.76 | Comp. ex. |
| 7 | Martensite | 0.2 | 1521 | 646 | 0.71 | Comp. ex. |
| 7 | Martensite | 0.3 | 2089 | 647 | 0.98 | Inv. ex. |
| 7 | Martensite | 0.5 | 2192 | 682 | 0.97 | Inv. ex. |
| 7 | Martensite | 0.5 | 2039 | 635 | 0.97 | Inv. ex. |
| 7 | Martensite | 0.4 | 1793 | 647 | 0.84 | Comp. ex. |
| 7 | Martensite | 0.2 | 1763 | 640 | 0.83 | Comp. ex. |
| 7 | Martensite | 0.3 | 2149 | 666 | 0.98 | Inv. ex. |
| 7 | Martensite | 0.4 | 2214 | 691 | 0.97 | Inv. ex. |
| 7 | Martensite | 0.5 | 2154 | 675 | 0.97 | Inv. ex. |
| 7 | Martensite | 0.3 | 2197 | 688 | 0.97 | Inv. ex. |
| 7 | Martensite | 0.2 | 1600 | 644 | 0.75 | Comp. ex. |
| 7 | Martensite | 0.2 | 1636 | 649 | 0.76 | Comp. ex. |
| 7 | Martensite | 0.4 | 2150 | 670 | 0.97 | Inv. ex. |
| 7 | Martensite | 0.5 | 2215 | 685 | 0.98 | Inv. ex. |
| 7 | Martensite | 0.5 | 2264 | 707 | 0.97 | Inv. ex. |
| 7 | Martensite | 0.4 | 2095 | 652 | 0.97 | Inv. ex. |
| 7 | Martensite | 0.5 | 2039 | 634 | 0.97 | Inv. ex. |
| 7 | Martensite | 0.4 | 1591 | 646 | 0.75 | Comp. ex. |
| 7 | Martensite | 0.4 | 2251 | 696 | 0.98 | Inv. ex. |
| 7 | Martensite | 0.4 | 2007 | 629 | 0.97 | Inv. ex. |
| 7 | Martensite | 0.4 | 2174 | 675 | 0.98 | Inv. ex. |
| 7 | Tempered martensite | 0.4 | 2056 | 638 | 0.98 | Inv. ex. |
| 7 | Martensite | 0.1 | 1762 | 648 | 0.82 | Comp. ex. |
| 7 | Martensite | 0.4 | 2099 | 650 | 0.98 | Inv. ex. |
| 7 | Martensite | 0.4 | 2156 | 665 | 0.98 | Inv. ex. |
| 7 | Martensite | 0.5 | 2114 | 654 | 0.98 | Inv. ex. |
| 7 | Martensite | 0.6 | 1631 | 642 | 0.77 | Comp. ex. |

TABLE 3-1-continued

| | | | | | | |
|---|---|---|---|---|---|---|
| 7 | Martensite | 0.4 | 2165 | 676 | 0.97 | Inv. ex. |
| 7 | Martensite | 0.5 | 2212 | 684 | 0.98 | Inv. ex. |

In the hot stamped article, the above-mentioned method was used to measure the area ratios of the lower bainite, martensite, and tempered martensite and the grain boundary solid solution ratios of Nb and Mo.

The strength of the hot stamped article was evaluated by performing a tensile test. The tensile test was performed by preparing a No. 5 test piece described in JIS Z 2201 and following the test method described in JIS Z 2241. A maximum strength of 2000 MPa or more was deemed as passing.

Further, the shock absorption was evaluated by the presence of any early fracture. A material in which no early fracture occurred under the following evaluation criteria was deemed as passing. Excellent shock absorption means a large amount of adsorption of energy at the time of shock. That is, the integrated value at the stress-strain curve is large. This is evaluated by no early fracture occurring (fracture after reaching maximum stress).

When the value of the maximum strength obtained in the tensile test divided by a value of 3.3 times the Vickers hardness of the material is 0.85 or more, it is judged that early fracture is being suppressed. The Vickers hardness of the material was measured by the following method.

A cross-section vertical to the sheet surface was cut out from the hot stamped article, #600 to #1500 silicon carbide paper was used to polish the measurement surface, then a solution of particle size 1 μm to 6 μm diamond powder dispersed in alcohol or another diluent or pure water was used to finish the sample to a mirror surface. A Vickers hardness tester was used to measure 10 points at a sheet thickness ¼ position by a load of 1 kgf at measurement intervals of intervals of 3 times or more the indentations. The average value was deemed the hardness of the steel sheet.

The hot stamped article of the present invention was confirmed to have a tensile strength of 2000 MPa or more and suppressed in early fracture. On the other hand, in examples where the composition and method for manufacture were not suitable, the targeted characteristics could not be obtained.

The invention claimed is:

1. A hot stamped article having a chemical composition comprising, by mass %,
   C: 0.35% to 0.75%,
   Si: 0.005% to 0.25%,
   Mn: 0.5% to 3.0%,
   sol. Al: 0.0002% to 3.0%,
   Cr: 0.05% to 1.00%,
   B: 0.0005% to 0.010%,
   Nb: 0.01% to 0.15%,
   Mo: 0.005% to 1.00%,
   Ti: 0% to 0.15%,
   Ni: 0% to 3.00%,
   P: 0.10% or less,
   S: 0.10% or less,
   N: 0.010% or less, and
   a balance of Fe and unavoidable impurities,
   microstructures in which prior austenite has an average crystal grain size of 3 μm or less, at least one of lower bainite, martensite, and tempered martensite are contained with an area rate of 90% or more, and
   a grain boundary solid solution ratio Z defined by Z=(mass % of one or both of Nb and Mo at the grain boundaries)/(mass % of one or more of Nb and Mo at time of dissolution) is 0.3 or more.

2. A hot stamped article according to claim 1, wherein the hot stamped article comprises a plated layer.

* * * * *